United States Patent

Kawashima

[11] Patent Number: 6,128,107
[45] Date of Patent: *Oct. 3, 2000

[54] IMAGE APPARATUS HAVING DIFFERENT MOTORS FOR SEPARATING AND READING DOCUMENTS

[75] Inventor: Yasuhiro Kawashima, Atugi, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/843,277

[22] Filed: Apr. 14, 1997

[30] Foreign Application Priority Data

Apr. 12, 1996 [JP] Japan ................................. 8-114387
Jul. 5, 1996 [JP] Japan ................................. 8-194164

[51] Int. Cl.[7] .............................. H04N 1/00; H04N 1/36; H04N 1/04; B65H 5/00
[52] U.S. Cl. ......................... 358/498; 358/400; 358/401; 358/412; 271/10.09; 271/270
[58] Field of Search .................................. 358/296, 498, 358/400, 401, 409, 412, 474, 496, 497; 399/365, 367; 271/10.01, 10.09, 10.11, 270; 355/50; 318/685, 696

[56] References Cited

U.S. PATENT DOCUMENTS

| 3,602,639 | 8/1971 | Alden | 358/474 |
|---|---|---|---|
| 4,774,591 | 9/1988 | Matsunawa et al. | 358/498 |
| 4,777,511 | 10/1988 | Takahashi | 399/374 |
| 5,401,012 | 3/1995 | Taruki | 271/10.01 |
| 5,491,397 | 2/1996 | Hirakawa | 318/696 |
| 5,497,250 | 3/1996 | Kawashima | 358/498 |

FOREIGN PATENT DOCUMENTS 7-55736  6/1995  Japan ............................. B65H 3/06

*Primary Examiner*—Kimberly A. Williams
*Attorney, Agent, or Firm*—Oblon, Spivak, McClelland, Maier & Neustadt, P.C.

[57] ABSTRACT

An imaging device includes a separating unit for separating individual sheets of an original document. The separating unit feeds such individual sheets to a reading unit which can read images on a document. To ensure stable operation of both the separating unit and the reading unit, the separating unit is provided with a dedicated separating motor for driving the elements therein, and the reading unit is provided with a dedicated reading motor for driving the elements therein. Moreover, a first transporting roller in the separating unit has a rotating speed which is equal to or greater than a rotating speed of a second transporting roller provided in the reading unit, to thereby ensure stable feeding of the original document sheet from the separating unit to the reading unit. This structure ensures that any fluctuations in the driving elements of the separating unit will not adversely affect any driving elements in the reading unit.

20 Claims, 3 Drawing Sheets

IMAGE APPARATUS HAVING DIFFERENT MOTORS FOR SEPARATING AND READING DOCUMENTS

BACKGROUND OF THE INVENTION

1. Field of the Invention

The present invention is directed to an imaging apparatus used in an image forming apparatus such as a facsimile apparatus, etc. More particularly, the present invention is directed to an imaging apparatus which includes a separating unit and a reading unit.

2. Discussion of the Background

An imaging apparatus for reading an original document is disclosed in Japanese Laid-Open Patent No. 1-271330. The imaging apparatus disclosed in this document includes a separating unit and a reading unit. In the separating unit, sheets of an original document placed on an original document table are separated one sheet by one sheet. In the reading unit, sheets of the original document which have been separated in the separating unit are read and then discharged.

In this background device operations in both the separating unit and reading unit are controlled by the same one motor. In this background device the original document to be read is transported at a predetermined speed based on an image reading resolution of a sensor in the reading unit. Transporting of the original document is stopped if a capacity of a memory for storing image data during reading of the original document is exceeded.

For these reasons, a stepping motor is typically used as the one motor controlling both the separating unit and the reading unit. In a typical stepping motor utilized in such a device, which may be a two-phases hybrid type, torque decreases around 2000 pps (pulse per second)—3000 pps, and a maximum speed is 3500 pps.

A high performance in reading the original document is now required, and as a result the stepping motor is driven with a large current and heavy torque. However, this results in an increase in vibration, noise, and heat generated from the stepping motor.

In the separating unit, a driving load of a transporting roller is larger than that of a separating roller. As a result, a load fluctuation occurs when the original document is separated from the separating roller. Such a load fluctuation may be transmitted to a shaft of the stepping motor, which thereby causes uneven rotation in the stepping motor. In such an imaging apparatus equipped with only one stepping motor, the load fluctuation from the separating unit is transmitted to rollers in the reading unit, which thereby results in the reading unit not correctly reading image data.

SUMMARY OF THE INVENTION

Accordingly, one object of this invention is to provide a novel imaging apparatus which can solve the aforementioned drawbacks.

In this way, one object of the present invention is to provide a novel imaging apparatus in which image data of an original document is correctly obtained in a reading unit.

It is another object of the present invention to provide a novel imaging apparatus in which vibration, noise, and heat generated from a motor controlling a reading unit and a separating unit is decreased.

It is another object of the present invention to provide a novel imaging apparatus which can ensure proper feeding of a document from a separating unit to a reading unit.

In order to achieve these objects, one structure of the novel imaging apparatus of the present invention provides a separate motor for each of a separating unit and a reading unit. The present invention also provides a novel operation in controlling speeds of rollers within the separating unit and the reading unit to ensure proper feeding of papers from the separating unit to the reading unit.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
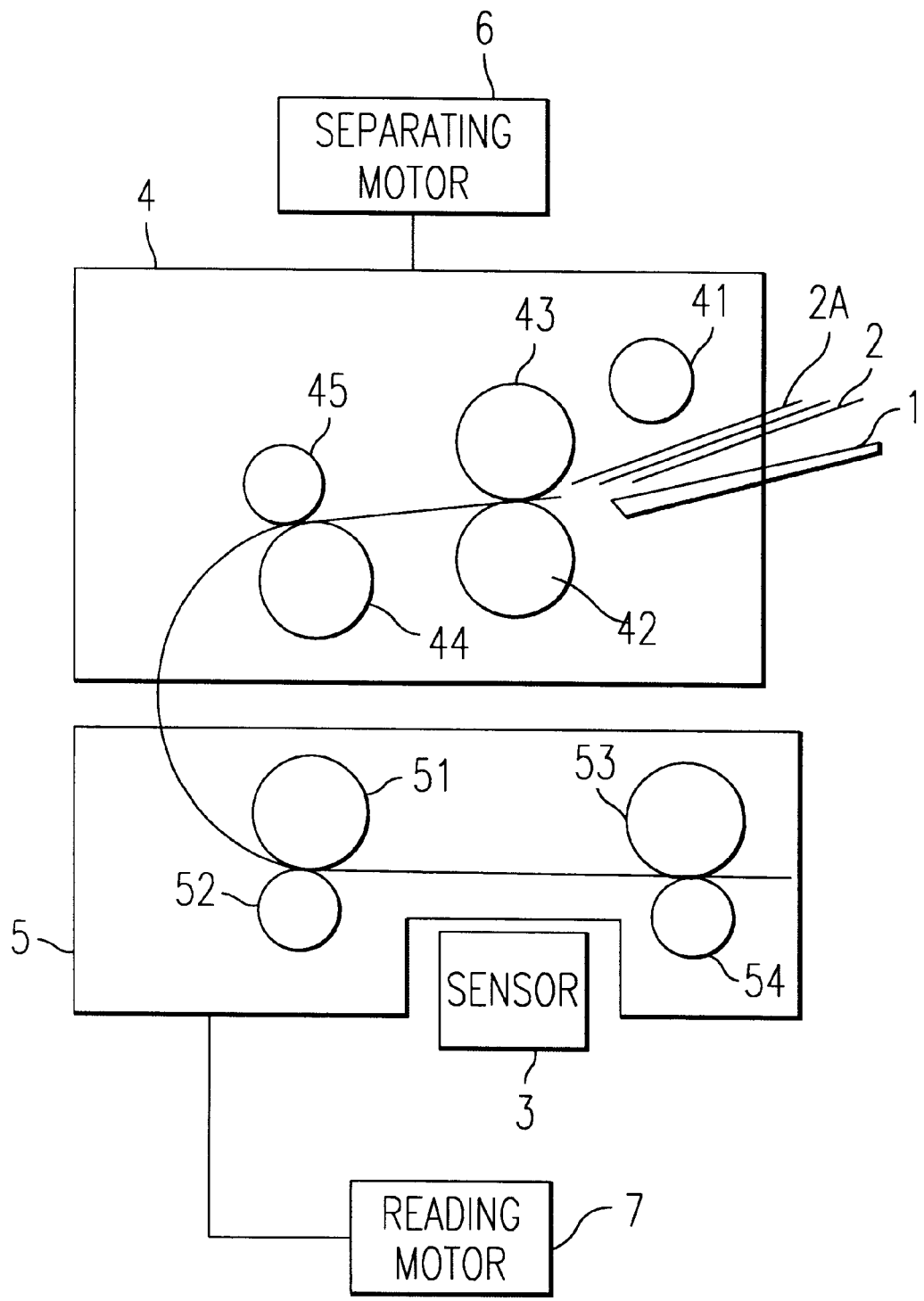
FIG. 1 shows an imaging apparatus with a separating unit and a reading unit in accordance with the present invention.

Preferred embodiments of an imaging apparatus in accordance with the present invention will now be explained with reference to the accompanying drawings, wherein like reference numerals are utilized to designate identical or corresponding elements throughout the several views.

FIG. 1 shows an imaging apparatus with a separating unit 4 and a reading unit 5 in accordance with the present invention.

In FIG. 1, the separating unit 4 includes an original document table 1 and a separating motor 6. The reading unit 5 includes a sensor 3 for reading an original document 2 (e.g. sensor 3 is a CCD) and a reading motor 7.

The separating unit 4 also includes a pick-up roller 41, a separating roller 42, a feeding roller 43, a first transporting roller 44, and a first pressurizing roller 45. The pick-up roller 41 picks up at least an upper original document sheet 2a of the original document 2 from the original document table 1. The separating roller 42 separates only the upper original document sheet 2a from the original document 2, which is picked up by the pick-up roller 41. The feeding roller 43 is disposed opposite the separating roller 42 and feeds the original document sheet 2a to the first transporting roller 44 and the first pressurizing roller 45. The first transporting roller 44 transports the original document sheet 2a to the reading unit 5. The first pressurizing roller 45 is disposed opposite of the first transporting roller 44 and pressurizes the original document sheet 2a toward the first transporting roller 44.

The reading unit 5 includes a second transporting roller 51, a second pressurizing roller 52, a third transporting roller 53, and a third pressurizing roller 54. The second transporting roller 51 receives the original document sheet 2a transported from the separating unit 4, and transports the original document sheet 2a to the sensor 3 at a predetermined speed based on an image reading resolution of the sensor 3. The second pressurizing roller 52 is disposed opposite of the second transporting roller 51 and pressurizes the original document sheet 2a toward the second transporting roller 51. The third transporting roller 53 transports the original document sheet 2a out of the reading unit 5. The third pressurizing roller 54 is disposed opposite of the third transporting roller 53 and pressurizes the original document sheet 2a toward the third transporting roller 53.

The separating motor 6 transmits driving forces to each of the pick-up roller 41, the separating roller 42, the feeding roller 43, the first transporting roller 44, and the first pressurizing roller 45 in the separating unit 4 through timing belts and gears (not shown).

The reading motor 7 transmits driving forces to each of the second transporting roller 51, the second pressurizing roller 52, the third transporting roller 53, and the third pressurizing roller 54 in the reading unit 5 through timing belts and gears (not shown).

In this way, the elements in the separating unit 4 and the reading unit 5 are separately driven by the respective separating motor 6 and the reading motor 7.

Figure 2A:
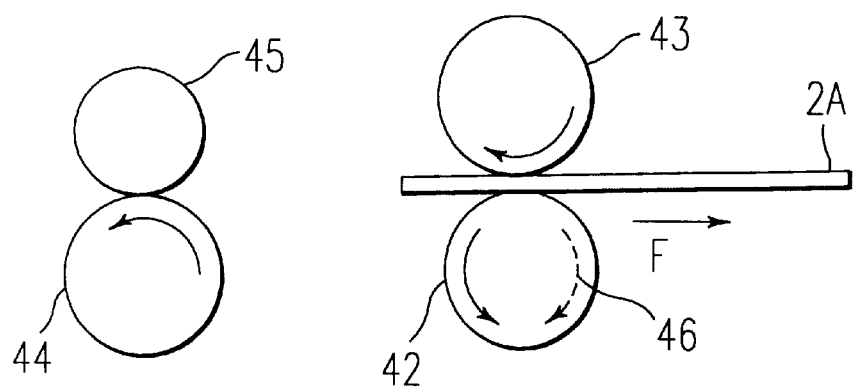
FIGS. 2(a)–2(c) are drawings explaining an occurrence of a load fluctuation in the separating unit of a first embodiment in accordance with the present invention.
Figure 2B:
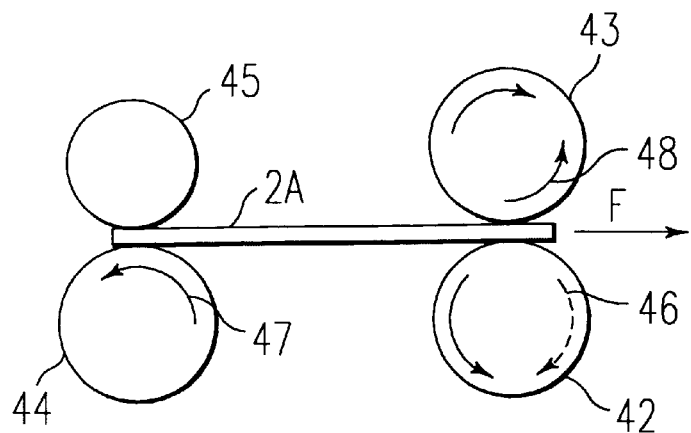
Figure 2C:
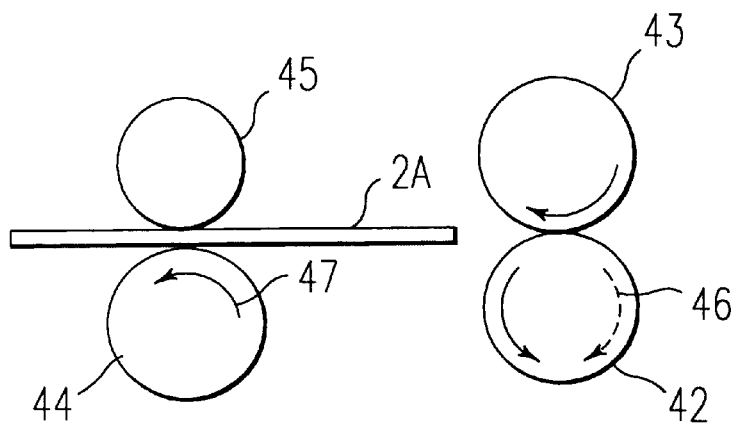

FIGS. 2(a), 2(b) and 2(c) explain an occurrence of a load fluctuation in the separating unit 4 of a first embodiment in accordance with the present invention.

In FIG. 2(a) the original document sheet 2a stacked on the original document table 1 is transported to the separating roller 42 and the feeding roller 43 by the pick-up roller 41. A front portion of the original document sheet 2a, when positioned between the separating roller 42 and the feeding roller 43 as shown in FIG. 2(a), may receive a counter rotating force 46 of the separating roller 42, which causes a pulling back force F.

That is, and as is well known in the art, separating roller 42 may typically rotate based on friction with feeding roller 43 and the original document sheet 2a. Rotation of separating roller 42 in a clockwise direction is typically eliminated by the use of a torque limiter. However, slippage may occur between the separating roller 42 and the feeding roller 43 or between the separating roller 42 or feeding roller 43 and the original document sheet 2a, for example if two documents sheets 2a are inadvertently fed, giving rise to the counter rotating force 46, as is well known in the art. As the feeding roller 43 transports the original document sheet 2a, the feeding roller 43 is acted on by the pulling back force F resulting from this above-discussed counter rotating force 46.

In FIG. 2(b), the front portion of the original document sheet 2a reaches a point between the first transporting roller 44 and the first pressurizing roller 45. At this time, an end portion of the original document sheet 2a is still at a point between the separating roller 42 and the feeding roller 43. In this state as shown in FIG. 2(b), first transporting roller 44 receives a pulling back force F toward the separating roller 42.

That is, and as is also well known in the art, the first transporting roller 44 typically has a slightly greater rotational speed than that of the separating roller 42, to ensure that any later fed original document sheets 2a do not contact prior fed original document sheets 2a. Such a difference in speed may result in the pulling back force F towards the separating roller 43 shown in FIG. 2(b). Such a pulling back force F can also result from slippage of the feeding roller 42 or separating roller 43 as discussed above. As a result of the pulling back force F as shown in FIG. 2(b), a driving load of torque 47 in the first transporting roller 43 increases. A rotating speed of the feeding roller 43 is also thereby less than that of the first transporting roller 44. The feeding roller 43 is driven by the first transporting roller 44 and has no driving load of torque 48.

In FIG. 2(c), the end portion of the original document sheet 2a separates from the separating roller 42 and the feeding roller 43. Then, a driving load of torque 47 in the first transporting roller 44 decreases. In this state as shown in FIG. 2(c), the feeding roller 43 still receives the counter rotating force 46 from the separating roller 42. In this situation, the separating roller 42, the feeding roller 43, the first transporting roller 44, and the first pressurizing roller 45 in the separating unit 4 have large load fluctuations. Such large load fluctuations may have an adverse effect on the separating motor 6. If only one motor is provided for both the separating unit 4 and reading unit 5, such load fluctuations would have an adverse effect on the motor control of the reading unit 5, and thus adversely effect a reading operation in the reading unit 5.

However, in the present invention these load fluctuations in the separating unit 4 do not transmit to the reading unit 5 because the reading unit 5 has its own reading motor 7. Thus, in the present invention the original document 2 to be read is transported at a predetermined speed based on an image resolution of the sensor 3 without being adversely effected by load fluctuations in the separating unit 4. Image data of the original document 2 can thereby be correctly obtained in the reading unit 5 in the present invention.

Figure 3:
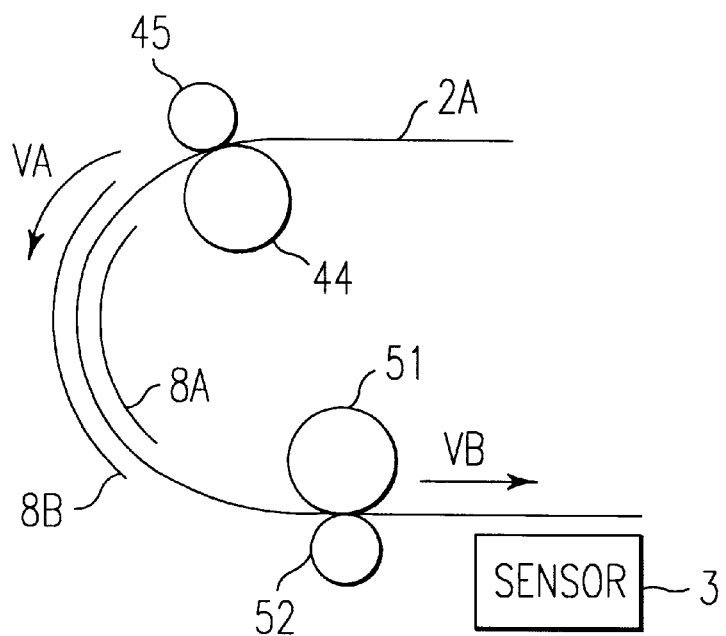
FIG. 3 is a drawing explaining an occurrence of a load fluctuation in the reading unit of the first embodiment in accordance with the present invention.

FIG. 3 is a drawing explaining an occurrence of load fluctuations in the reading unit 5 of the first embodiment in accordance with the present invention.

In FIG. 3, when a rotating speed VA of an outer surface of the first transporting roller 44 in the separating unit 4 is less than a rotating speed VB of an outer surface of the second transporting roller 51 in the reading unit 5, the original document sheet 2a is pulled tight between the first transporting roller 44 and the second transporting roller 51. In this situation, the original document sheet 2a comes into contact with an inner guide plate 8a, and consequently a driving load of torque in the second transporting roller 51 increases as a result of this friction between the original document sheet 2a and the inner guide plate 8a. Further, when the end portion of the original document sheet 2a is separated from the first transporting roller 44 in the separating unit 4, the second transporting roller 51 has no driving load of torque caused by the first transporting roller 44. As a result of this situation of VA being less than VB, large load fluctuations occur in the second transporting roller 51. As a result, image data of the original document sheet 2a may not be correctly obtained in the reading unit 5 or the reading motor 7 may not function properly.

To overcome this possibility of not obtaining correct image data in reading unit 5 or reading motor 7 not functioning properly, as a further feature of the present invention the rotating speed VA of the first transporting roller 44 in the separating unit 4 may be set to be equal to or greater than the rotating speed VB of the second transporting roller 51 in the reading unit 5.

There are at least two ways in which the rotating speed VA of the first transporting roller 44 can be made greater than or equal to the rotating speed VB of the second transporting roller 51. One possible way to implement this difference in rotating speeds is to have separating motor 6 and reading motor 7 drive the respective first transporting roller 44 and second transporting roller 51 at the different speeds. Another way to achieve such an objective is to utilize a separating motor 6 which is identical to a reading motor 7, but to make an outer diameter of the first transporting roller 44 slightly greater than an outer diameter of the second transporting roller 51. This results in the first transporting roller 44 having a slightly greater rotating speed VA than the rotating speed VB of the second transporting roller 51.

Moreover, in the present invention it is preferable that the rotating speed VA is only slightly greater than the rotating speed VB. For example, in the present invention the rotating speed VA could be up to 1% greater than the rotating speed VB. If the rotating speed VA is selected to be much greater than the rotating speed VB, this results in the original document sheet 2a becoming rippled as it contacts against the outer guide plate 8b.

Figure 4:
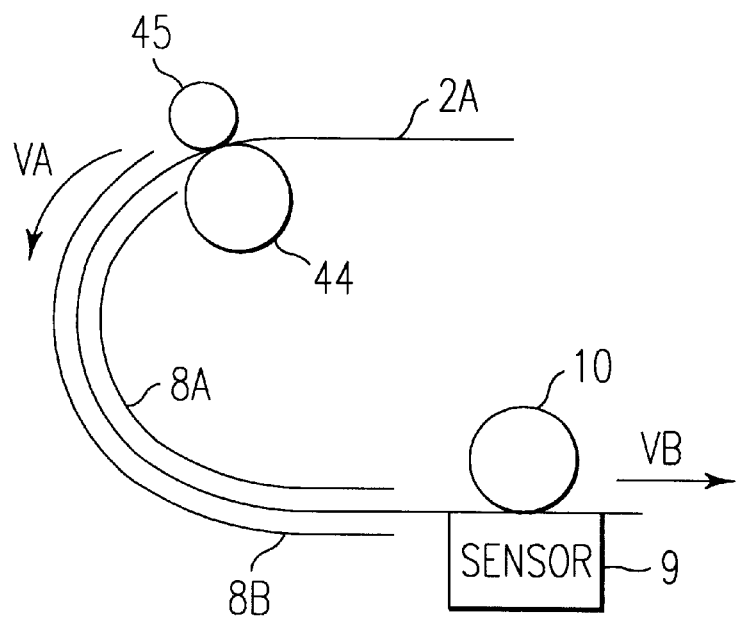
FIG. 4 is a drawing explaining an occurrence of a load fluctuation in a reading unit of a second embodiment in accordance with the present invention.

FIG. 4 is a drawing of a reading unit 5 in a further embodiment in accordance with the present invention.

In FIG. 4, a contacting-type sensor 9 and a platen roller 10 are provided in the reading unit 5 instead of the second transporting roller 51, the second pressurizing roller 52 and the sensor 3 in the reading unit 5 of the embodiment of FIG. 3. In this further embodiment, the original document sheet 2a to be read is transported at a predetermined speed based on an image resolution of the contacting-type sensor 9 by the platen roller 10. Further, the rotating speed VA of the first transporting roller 44 in the separating unit 4 can be set to be equal to or slightly larger than the rotating speed VB of the platen roller 10 in the reading unit 5 as in the embodiment of FIG. 3. In this further embodiment as shown in FIG. 4, the relative rotating speeds VA and VB are set in the same manner as in the third embodiment of FIG. 3, so that this further embodiment of FIG. 4 can achieve the same advantages as the embodiment of FIG. 3 as discussed above.

Obviously, numerous additional modifications and variations of the present invention are possible in light of the above teachings. It is therefore to be understood that within the scope of the appended claims, the present invention may be practiced otherwise than as specifically described herein.

The present application is based on Japanese Priority Documents 08-114397 and 08-194164, the entire contents of which are hereby incorporated by reference.

What is claimed as new and desired to be secured by Letters Patent of the United States is:

1. An imaging device for reading an image from an original document, comprising:

a separating unit including at least a first transporting roller contacting the original document and separating one document sheet from the original document;

a separating stepping motor driving the separating unit;

a reading unit including at least a second transporting roller contacting the separated one document sheet and reading an image on the separated one document sheet; and a reading stepping motor driving the reading unit, wherein the first transporting roller rotates at a first speed of rotation greater than or equal to a second speed of rotation at which the second transporting roller rotates, and wherein the first transporting roller has a greater diameter than the second transporting roller.

2. The imaging device according to claim 1, wherein the separating motor and reading motor have a same operation speed.

3. An imaging device for reading an image from an original document, comprising:

a separating unit including at least a first transporting roller contacting the original document and separating one document sheet from the original document;

a separating stepping motor driving the separating unit;

a reading unit including at least a second transporting roller contacting the separated one document sheet and reading an image on the separated one document sheet; and a reading stepping motor driving the reading unit, wherein the first transporting roller rotates at a first speed of rotation greater than or equal to a second speed of rotation at which the second transporting roller rotates, and wherein the first speed of rotation of the first transporting roller is up to 1% greater than the second speed of rotation of the second transporting roller.

4. The imaging device according to claim 3, wherein the separating motor and reading motor have a same operation speed.

5. An imaging device for reading an image from an original document, comprising:

a separating unit including at least a first transporting roller contacting the original document and separating one document sheet from the original document;

a separating stepping motor driving the separating unit;

a reading unit including at least a second transporting roller contacting the separated one document sheet and reading an image on the separated one document sheet; and a reading stepping motor driving the reading unit, and wherein said second transporting roller is a platen transporting roller formed opposite a contact type sensor, the platen transporting roller being driven by the reading motor.

6. The imaging device according to claim 5, wherein the first transporting roller rotates at a first speed of rotation greater than or equal to a second speed of rotation at which the platen transporting roller rotates.

7. The imaging device according to claim 6, wherein the first speed of rotation of the first transporting roller is up to 1% greater than the platen speed of rotation of the second transporting roller.

8. The imaging device according to claim 6, wherein the first transporting roller has a greater diameter than the platen transporting roller.

9. The imaging device according to claim 8, wherein the first speed of rotation of the first transporting roller is up to 1% greater than the second speed of rotation of the platen transporting roller.

10. The imaging device according to claim 8, wherein the separating motor and reading motor have a same operation speed.

11. An imaging device for reading an image from an original document, comprising:

separating means including at least a first transporting roller contacting the original document and for separating one document sheet from the original document;

separating stepper motor means for driving the separating means;

reading means including at least a second transporting roller contacting the separated one document sheet and for reading an image on the separated one document sheet; and reading stepper motor means for driving said reading means, wherein the first transporting means rotates at a first speed of rotation greater than or equal to a second speed of rotation at which the second transporting means rotates, and wherein the first transporting means has a greater diameter than the second transporting means.

12. The imaging device according to claim 11, wherein the separating motor means and reading motor means have a same operation speed.

13. The imaging device according to claim 11, wherein the separating motor means and reading motor means have a same operation speed.

14. An imaging device for reading an image from an original document, comprising:

separating means including at least a first transporting roller contacting the original document and for separating one document sheet from the original document;

separating stepper motor means for driving the separating means;

reading means including at least a second transporting roller contacting the separated one document sheet and for reading an image on the separated one document sheet; and reading stepper motor means for driving said reading means, wherein the first transporting means rotates at a first speed of rotation greater than or equal to a second speed of rotation at which the second transporting means rotates, and wherein the first speed of rotation of the first transporting means is up to 1% greater than the second speed of rotation of the second transporting means.

15. An imaging device for reading an image from an original document, comprising:

separating means including at least a first transporting roller contacting the original document and for separating one document sheet from the original document;

separating stepper motor means for driving the separating means;

reading means including at least a second transporting roller contacting the separated one document sheet and for reading an image on the separated one document sheet; and reading stepper motor means for driving said reading means, and wherein said transporting means includes a platen means formed opposite a contact type sensor means, the platen means being driven by the reading motor means.

16. The imaging device according to claim 15, wherein the first transporting means rotates at a first speed of rotation greater than or equal to a second speed of rotation at which the platen means rotates.

17. The imaging device according to claim 16, wherein the first transporting means has a greater diameter than the second transporting means.

18. The imaging device according to claim 17, wherein the first speed of rotation of the first transporting means is up to 1% greater than the second speed of rotation of the second transporting means.

19. The imaging device according to claim 16, wherein the first speed of rotation of the first transporting means is up to 1% greater than the second speed of rotation of the second transporting means.

20. The imaging device according to claim 16, wherein the separating motor means and reading motor means have a same operation speed.

* * * * *